Patented July 26, 1932

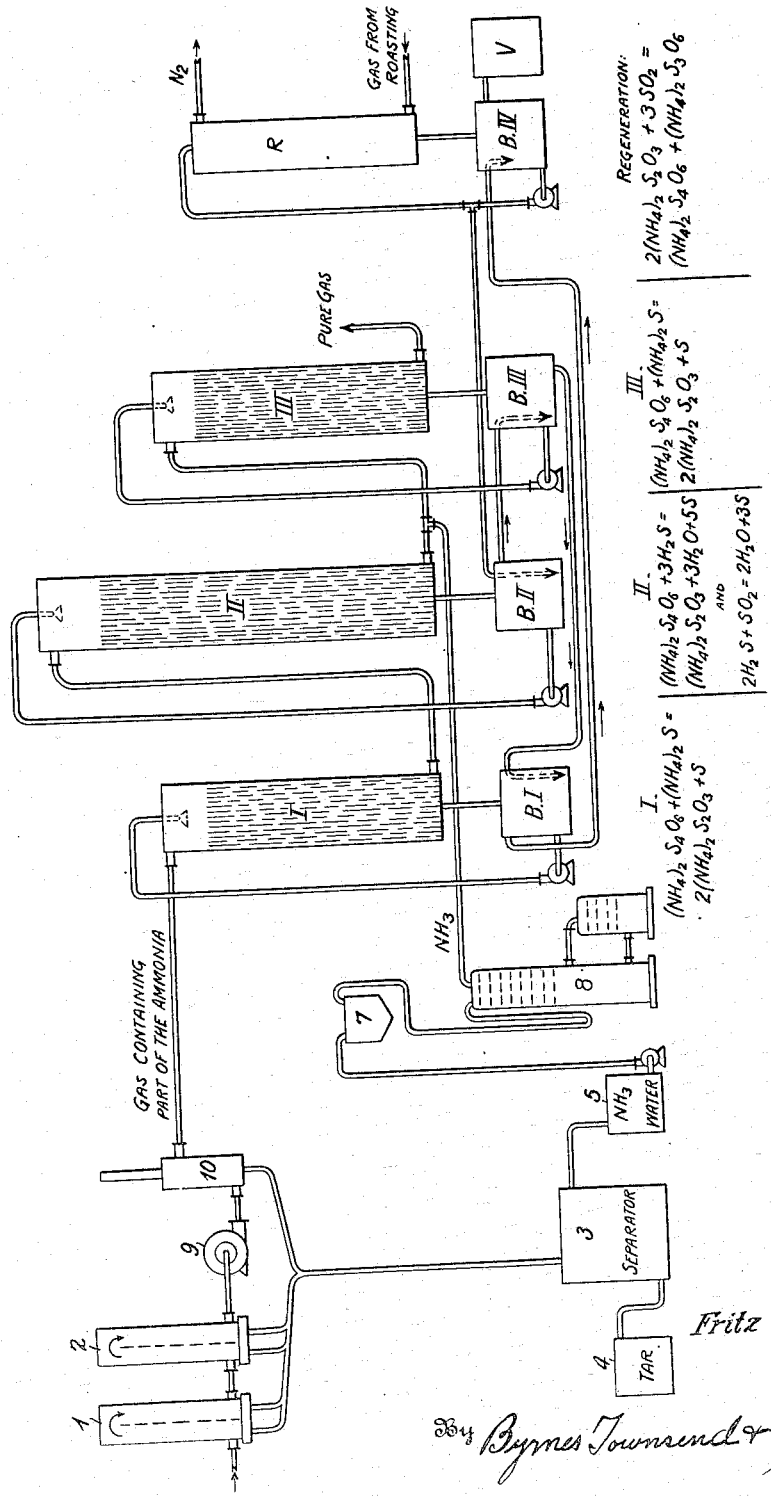

1,868,843

UNITED STATES PATENT OFFICE

FRITZ OVERDICK, OF LEVERKUSEN/WIESDORF, GERMANY, ASSIGNOR TO I. G. FARBENINDUSTRIE AKTIENGESELLSCHAFT, OF FRANKFORT-ON-THE-MAIN, GERMANY

PROCESS FOR REMOVING AMMONIA AND HYDROGEN SULPHIDE FROM GASES

Application filed July 6, 1931, Serial No. 549,011, and in Germany July 10, 1930.

The present invention is an improvement in and further development of U. S. Patent 1,826,779 (Serial No. 286,712, filed June 19, 1928,) for the removal of ammonia and hydrogen sulphide from gases by means of polythionate and thiosulphate solutions and consists in effecting regeneration of the used washing solution by diverting only a portion of the stream of solution from the washing stage in which an excess of hydrogen sulphide over the ammonia is present and in utilizing the liquor returning from the regeneration first for washing the gas which is free from ammonia in order to convert the free sulphurous acid and then after further use in the last washing stage returning the liquor to the washing stage first mentioned with the result that part of the washing solution goes through a cycle between the individual gas washers and the regeneration. By appropriately adjusting the circulation serving for the solution the thiosulphate and polythionate portions of the solution in the regeneration can be brought to the ratio desired for the further working up of the excess solution.

U. S. Patent (Serial No. 286,712, filed June 19, 1928) describes a process wherein ammonia and hydrogen sulphide are washed out from gases by means of polythionate solutions and indeed in such a manner that the ammonia is removed from the gas wholly or in part before the washing process and the gas is then treated in several stages with polythionate solution, the ammonia which has been separated being added in the last stage. In the first washing stages such a quantity of hydrogen sulphide is separated that in the last stage for each molecule of hydrogen sulphide at least two molecules of ammonia are available. By taking up ammonia and hydrogen sulphide polythionate is converted to thiosulphate, which in turn is regenerated to polythionate by treatment with sulphurous acid.

The regenerated solution always contains noticeable quantities of free sulphurous acid, which on again being used for the treatment of the gas combines with ammonia to form sulphite with the result that part of the ammonia is lost so far as absorption of the hydrogen sulphide is concerned. Furthermore, it is known that the regeneration process is interferred with when the liquor to be regenerated, such as that withdrawn from the last washing stage still contains free ammonia, since the ammonium bisulphite formed strongly retards the polythionate formation (see Funke, Gas and Wasser 1925, page 420, right hand column).

In accordance with the present invention all these drawbacks are obviated very simply by proceeding as follows:

Only part of the gas washing liquor is caused to flow continuously to the regeneration. The part of the solution returning from the regeneration and still containing free acid is first treated in a washing stage, in which the gas contains hydrogen sulphide but no ammonia. The free sulphurous acid thereupon reacts in the known manner with part of the hydrogen sulphide with the result that the solution leaving the washer is practically free from sulphur dioxide and on entering the last washing stage no longer consumes ammonia. The part of the solution issuing from the last stage and still containing free ammonia serves for the preliminary treatment of the gas in a specially inserted washer, an excess of hydrogen sulphide over the quantity of ammonia being here always present, with the result that the part of the solution returning to the regeneration can no longer contain free ammonia and thus cannot lead to interference in the polythionate formation. Accordingly between the absorption stages and the regeneration there circulates therefore in the manner described a slow partial stream the strength whereof is dependent on the prevailing working conditions. A further advantage of this manner of working is to be found in the fact that it is possible to adjust the circulation and the addition of sulphur dioxide in the regeneration stage to comply with the ratio of thiosulphate: polythionate to 2:1 with the result that the excess liquor continuously flowing out can be boiled without special treatment to form sulphate and sulphur:

$$2(NH_4)_2S_2O_3 + (NH_4)_2S_4O_6 = 3(NH_4)_2SO_4 + 5S.$$

Obviously any other desired ratio of thiosulphate: polythionate can of course be maintained without special difficulty.

The improved process is illustrated by the attached drawing.

The drawing illustrates the process, for example, as applied to the purification of coke factory gas by the "semi-direct" manner of working, in which only part of the ammonia is separated from the gas in the coolers 1 and 2 with the water of condensation and after separation from tar in 3 (the tar passing to 4) and concentration in the ammonia still 8 to which it passes from the reservoir 7, being raised by the lifting pump 6 from the tank 5, is led into the washer III of the polythionate process. After the cooling and separation of tar from the remainder of the gas which is passed by the blower 9 to the separator of tar 10, it is subjected to the treatment with polythionate in the washers I, II and III. The washers are irrigated with the solutions from the corresponding containers $B_I$, $B_{II}$, $B_{III}$. The gas passing into the washer I contains only a portion of the ammonia and almost the whole quantity of hydrogen sulphide with the result that in consequence of the excess of hydrogen sulphide the polythionate solution in the container $B_I$ cannot contain free ammonia. In the present process part of the stream of the solution, containing principally thiosulphate besides a little polythionate, is led from this washing stage to the container $B_{IV}$, the solution of which is regenerated in the washer R by treatment with gases containing sulphur dioxide.

An equal quantity of freshly regenerated solution flows on from $B_{IV}$ to the container $B_{II}$ and here serves for the washing of the ammonia free gas in washer II. In this stage the free sulphur dioxide always present in the regenerated solution reacts with the hydrogen sulphide of the gas with the result that the portion of the solution flowing on towards $B_{III}$ is practically free from sulphur dioxide and does not consume ammonia. From $B_{III}$ part of the solution flows back to $B_I$. When the process is carried out as directed the excess liquor flowing out of $B_{IV}$ into the reservoir V contains the thiosulphate and polythionate in the ratio desired for boiling the solution.

The reaction taking place in the various parts of the plant are illustrated by the following equations:

I $$(NH_4)_2S_4O_6 + (NH_4)_2S = 2(NH_4)_2S_2O_3 + S$$

II $$(NH_4)_2S_4O_6 + 3H_2S =$$
$$\qquad (NH_4)_2S_2O_3 + 3H_2O + 5S$$

and $$2H_2S + SO_2 = 2H_2O + 3S$$

III $$(NH_4)_2S_4O_6 + (NH_4)_2S = 2(NH_4)_2S_2O_3 + S$$

Regeneration $$2(NH_4)_2S_2O_3 + 3SO_2 = (NH_4)_2S_4O_6 + (NH_4)_2S_3O_6$$

I claim:—

In the process for separating ammonia and hydrogen sulphide from gases containing same by washing the gases with liquors containing ammonium polythionate and ammonium thiosulphate, in which at least a part of the ammonia content of the gases is separated firstly, the residual gases are washed in several stages in such a manner that in the first stages such a part of the hydrogen sulphide content of the gases is separated that in the last stage for each molecule of hydrogen sulphide at least two molecules of ammonia are available by adding the separated ammonia to the last washing stage, the steps which comprise effecting regeneration of the used wash liquor by diverting only a portion of the stream of solution from the first washing stages in which an excess of hydrogen sulphide over the ammonia is present and in washing with the liquor returning from the regeneration firstly the gas which is free from ammonia in order to convert the free sulphurous acid and then after further use in the last washing stage returning the liquor to the first washing stage with the result that part of the washing solution goes through a cycle as described between the individual gas washers and the regeneration.

In testimony whereof, I affix my signature.

FRITZ OVERDICK.